US012640389B2

(12) United States Patent
Kim

(10) Patent No.: US 12,640,389 B2
(45) Date of Patent: May 26, 2026

(54) SYSTEM FOR MANUFACTURING ELECTRODE ASSEMBLY FOR BATTERIES

(71) Applicants: Hyundai Motor Company, Seoul (KR); Kia Corporation, Seoul (KR)

(72) Inventor: Kyung Mo Kim, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 190 days.

(21) Appl. No.: 18/211,845

(22) Filed: Jun. 20, 2023

(65) Prior Publication Data

US 2024/0186561 A1 Jun. 6, 2024

(30) Foreign Application Priority Data

Dec. 6, 2022 (KR) ........................ 10-2022-0168274

(51) Int. Cl.
*H01M 10/0583* (2010.01)
*H01M 10/04* (2006.01)
*H01M 50/531* (2021.01)
*H01M 50/54* (2021.01)

(52) U.S. Cl.
CPC ... *H01M 10/0459* (2013.01); *H01M 10/0404* (2013.01); *H01M 10/0583* (2013.01); *H01M 50/531* (2021.01); *H01M 50/54* (2021.01)

(58) Field of Classification Search
CPC ......... H01M 10/0404; H01M 10/0459; H01M 10/0583; H01M 10/0585; H01M 50/46; H01M 50/461; H01M 50/466; H01M 50/50; H01M 50/531; H01M 50/536; H01M 50/538; H01M 50/54
See application file for complete search history.

(56) References Cited

U.S. PATENT DOCUMENTS

| | | | |
|---|---|---|---|
| 2003/0031923 A1* | 2/2003 | Aoshima | H01M 10/052 429/130 |
| 2006/0096958 A1* | 5/2006 | Zhao | B23K 26/22 219/121.64 |
| 2011/0305938 A1 | 12/2011 | Yamamoto et al. | |
| 2014/0050958 A1 | 2/2014 | Kwon et al. | |
| 2019/0229360 A1* | 7/2019 | Böhm | H01M 10/0404 |
| 2019/0296319 A1 | 9/2019 | Choi et al. | |
| 2020/0227787 A1 | 7/2020 | Kang et al. | |
| 2024/0283002 A1* | 8/2024 | Keum | B65H 45/101 |

FOREIGN PATENT DOCUMENTS

| | | | | |
|---|---|---|---|---|
| KR | 10-2001-0111617 A | 12/2001 | | |
| KR | 101663351 B1 | 10/2016 | | |
| KR | 10-2020-0088067 A | 7/2020 | | |
| WO | WO-2023075330 A1 * | 5/2023 | | B65H 29/241 |

* cited by examiner

*Primary Examiner* — Michael A Tolin
(74) *Attorney, Agent, or Firm* — Banner & Witcoff, Ltd.

(57) ABSTRACT

Described herein is a system and/or method for manufacturing an electrode assembly for batteries. The system for manufacturing the electrode assembly may comprise a folding device configured to fold a laminated body, such that a plurality of electrodes may be disposed on a separator, into the electrode assembly, and a bonding device may be configured to temporarily bond electrode tabs of electrodes stacked on each other during the folding of the laminated body by the folding device.

12 Claims, 15 Drawing Sheets

SYSTEM FOR MANUFACTURING ELECTRODE ASSEMBLY FOR BATTERIES

CROSS-REFERENCE TO RELATED APPLICATION

This application claims priority under 35 U.S.C. § 119(a) to Korean Patent Application No. 10-2022-0168274 filed on Dec. 6, 2022, the entire contents of which are incorporated herein by reference.

BACKGROUND

(a) Technical Field

The present disclosure relates to batteries. More particularly, the present disclosure relates to a manufacturing process of an electrode assembly for batteries.

(b) Discussion of the Background

Recently, use of secondary batteries is being expanded to electronic equipment, electric vehicles, energy storage devices, etc. Among the secondary batteries, lithium ion batteries are widely used. The unit cell of a lithium ion battery may be manufactured by assembling positive electrodes and negative electrodes with a separator and sealing an electrode assembly. Additionally, the lithium ion battery may comprise an external case formed in a prismatic type, a pouch type, or a cylindrical type.

Referring to FIGS. 1 to 3, a process of assembling an electrode assembly 800 will be described. The electrode assembly 800 may include electrodes 810 and a separator 820, and the electrodes 810 may include positive electrodes 811 and negative electrodes 813. First, as shown in FIG. 1, in order to manufacture the electrode assembly 800, the positive electrodes 811 and the negative electrodes 813, which may be cut to have a designated area and/or shape, may be prepared, and the separator 820 may be folded into a Z shape. The electrode assembly 800 may be manufactured by alternately inserting the positive electrodes 811 and the negative electrodes 813 into the folded separator 820 and then applying pressure thereto.

Subsequently, as shown in FIG. 2, positive electrode tabs 821 of the electrode assembly 800 may be welded to each other, and negative electrode tabs 823 of the electrode assembly 800 may be welded to each other. Further, as shown in FIG. 3, leads 830 configured to achieve electrical connection with the outside may be welded to the welded positive electrode tabs 821 and the welded negative electrode tabs 823.

After manufacture of the electrode assembly 800, the electrode assembly 800 may be transferred to be subjected to subsequent processes, such as a welding process. In order to prevent deterioration of alignment of the electrodes 810 of the electrode assembly 800 during transfer, the electrode assembly 800 may be moved between respective processes in the state in which the electrode assembly 800 may be pressed using transport pallets having a pressing structure.

Descriptions in this background section are provided to enhance understanding of the background of the disclosure, and may include descriptions other than those of the prior art already known to those of ordinary skill in the art to which this technology belongs.

SUMMARY OF THE DISCLOSURE

The following summary presents a simplified summary of certain features. The summary is not an extensive overview and is not intended to identify key or critical elements.

The present disclosure may solve the above-described problems of misalignment of the electrodes during manufacture of the electrode assembly, and it is an object of the present disclosure to provide a system for manufacturing an electrode assembly which may prevent misalignment between electrodes during manufacture of the electrode assembly.

It is another object of the present disclosure to provide a system for manufacturing an electrode assembly which may speed up the electrode assembly for batteries. In one aspect, the present disclosure provides a system for manufacturing an electrode assembly. The system may comprise a folding device configured to receive a laminated body comprising a plurality of electrodes disposed on a separator, and fold the laminated body into the electrode assembly. The system may also comprise a bonding device configured to bond, during folding of the laminated body by the folding device, at least two electrodes of the laminated body.

In some examples, the plurality of electrodes may comprise positive electrodes and negative electrodes, the positive electrodes and the negative electrodes may be alternately disposed on the separator, the positive electrodes may be disposed on a first surface of the separator, and/or the negative electrodes may be disposed on a second surface of the separator.

In some examples, the folding device may comprise a pair of grip units configured to grip the laminated body and an actuator configured to rotate the pair of grip units. Each grip unit, of the pair of grip units, may be configured to be movable in a direction towards the laminated body or a direction away from the laminated body. Additionally, each grip unit, of the pair of grip units, may comprise an upper grip and a lower grip, where the lower grip may be spaced apart from the upper grip by a designated clearance, and each of the upper grip and the lower grip may comprise a contact jig configured to provide a pressing force. Each contact jig, of the pair of grip units, may comprise a hole, and the bonding device may be configured to bond the at least two electrodes by emitting a laser beam through one or more holes of the pair of grip units. The pair of grip units may further comprise a blocking member adjacent to at least one side of the hole of each contact jig of the pair of grip units.

In some examples, the bonding device may comprise a laser beam emitter configured to temporarily bond the at least two electrodes of the laminated body.

In some examples, the system may further comprise a supply device configured to supply the laminated body to the folding device. The supply device may comprise a pair of rollers configured to be rotated in opposite directions so that the laminated body passes between the pair of rollers, and an actuator configured to provide rotational force to the pair of rollers. The system may further comprise a guide disposed between the supply device and the folding device to guide transferring of the laminate body from the supply device to the folding device.

In some examples, the system may further comprise a cutting device disposed between the supply device and the folding device and configured to cut the laminated body into predetermined portions.

In some examples, the system may further comprise a holding device configured to provide, during the folding of the laminated body by the folding device, pressing force to the laminated body.

Other aspects and preferred examples of the manufacturing process of the electrode assembly are discussed infra. These and other features and advantages are described in greater detail below.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

Figure 1:
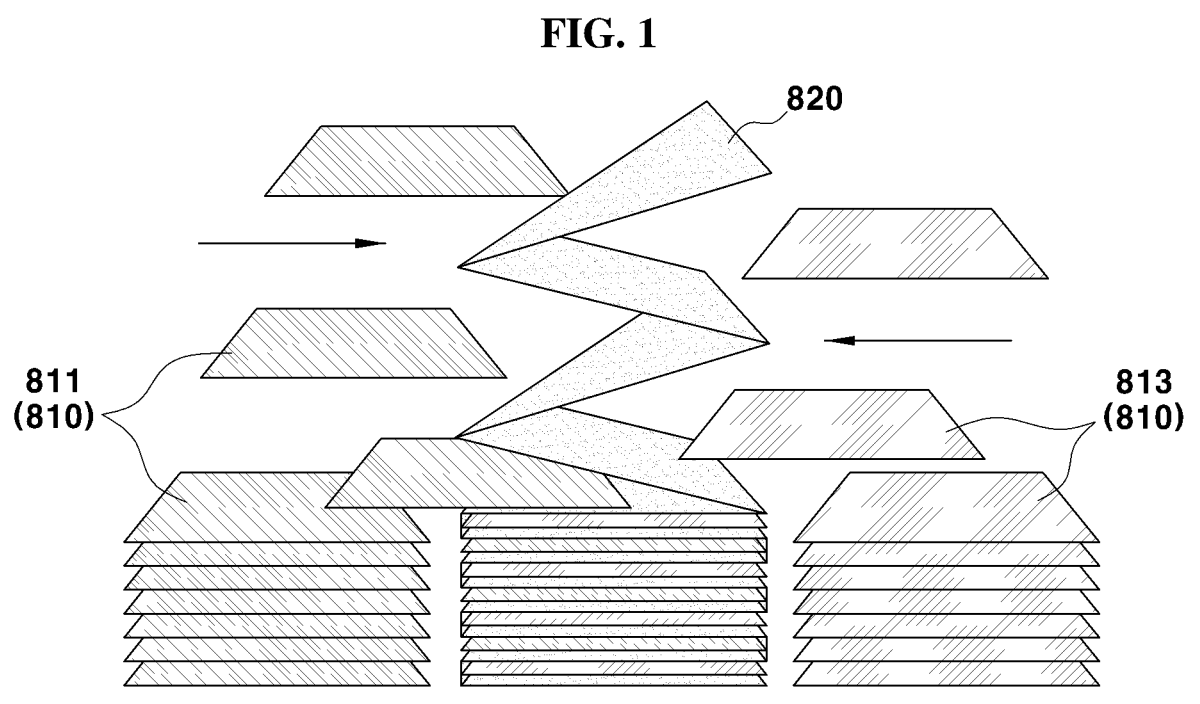

FIGS. 1, 2, and 3 are schematic views illustrating example processes for manufacturing an electrode assembly for batteries;

FIG. 5 is a front view of the system according to the present disclosure;

FIG. 6 is a planar view of the system according to the present disclosure;

FIG. 9 is a partial front view of the example system according to the present disclosure;

Figure 2:
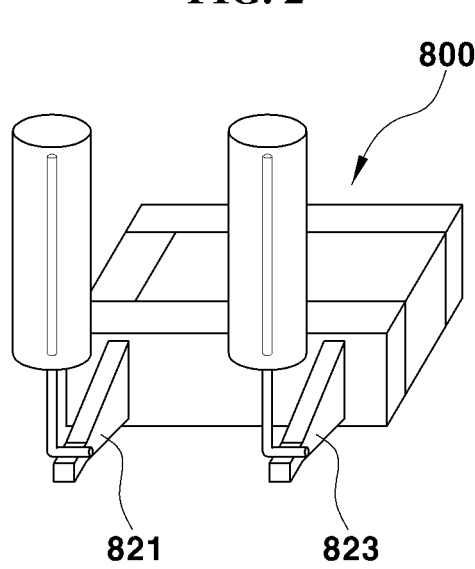
Figure 3:
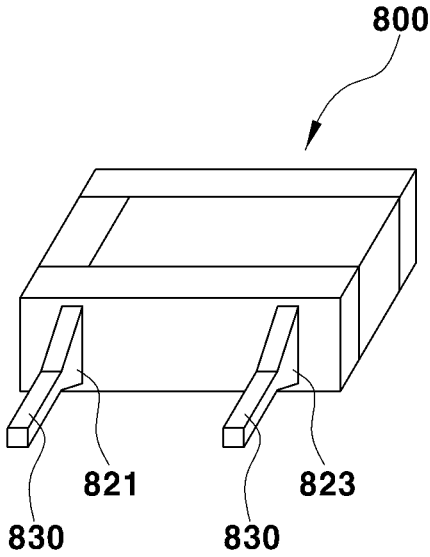

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and/or use environment.

In the figures, reference numbers refer to the same or equivalent parts of the present disclosure throughout the several figures of the drawing.

DETAILED DESCRIPTION

Specific structural or functional descriptions in embodiments of the present disclosure set forth in the description which follows will be exemplarily given to describe the embodiments of the present disclosure, and the present disclosure may be embodied in many alternative forms. Further, it will be understood that the present disclosure should not be construed as being limited to the embodiments set forth herein, and the embodiments of the present disclosure are provided only to completely disclose the disclosure and cover modifications, equivalents or alternatives which come within the scope and technical range of the disclosure.

In the following description of the embodiments, terms, such as "first" and "second," may be used only to describe various elements, and these elements should not be construed as being limited by these terms. These terms may be used only to distinguish one element from other elements. For example, a first element described hereinafter may be termed a second element, and similarly, a second element described hereinafter may be termed a first element, without departing from the scope of the disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there might not be any intervening elements or layers present. Other words used to describe relationships between elements should be interpreted in a like fashion, e.g., "between" versus "directly between," "adjacent" versus "directly adjacent," etc.

Wherever possible, the same reference numbers will be used throughout the drawings to refer to the same or like parts. The terminology used herein is for the purpose of describing particular embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

The above-described conventional process of manufacturing the electrode assembly 800 may be executed at a low speed. In the conventional process, the positive electrodes 811 and the negative electrodes 813 may be alternately inserted into the separator 820 while folding the separator 820 in zigzags, and/or the speed of such a process of inserting the positive electrodes 811 and the negative electrodes 813 into the separator 820 while folding the separator 820 may be two or more times slower than the speeds of processes executed before and after such a folding process. Therefore, in order to solve a bottleneck situation, two or four workstations may be configured to execute such a process of inserting the positive electrodes 811 and the negative electrodes 813 into the separator 820 while folding the separator 820 are operated in parallel.

As described above in brief, electrode misalignment may cause degradation in a battery capacity and may further cause a fire due to inner short-circuit by side reactions, and thus, maintenance of electrode alignment is a very important technical task. Therefore, the electrode assembly may be moved using transport pallets, and a pressing structure may be applied to the electrode assembly. However, in this case, the pressing structure needs to be applied to all the transport pallets and may thus cause increase in equipment investment costs. Further, at the time of unloading the transport pallets, the possibility that deterioration of electrode alignment occurring in an unpressed state may still not be excluded.

Therefore, the present disclosure provides a system for manufacturing an electrode assembly, which may prevent electrode misalignment during a manufacturing process. Particularly, in order to speed up the manufacturing process of the electrode assembly, positive electrodes and negative electrodes may be laminated in advance onto a separator. Further, the system according to the present disclosure may manufacture the electrode assembly by folding a laminated body, acquired by laminating the positive electrodes and the negative electrodes onto the separator, in zigzags through a separate operation.

Moreover, the system according to the present disclosure is configured such that neighboring electrode tabs are temporarily bonded simultaneously with folding of the separator during manufacture of the electrode assembly in order to prevent deterioration of electrode alignment during moving the electrode assembly between respective processes.

The present disclosure provides a system for manufacturing an electrode assembly, which may achieve a high-speed manufacturing process and improvement in electrode alignment.

Hereinafter, the present disclosure will be described in detail with reference to the accompanying drawings.

Figure 4:
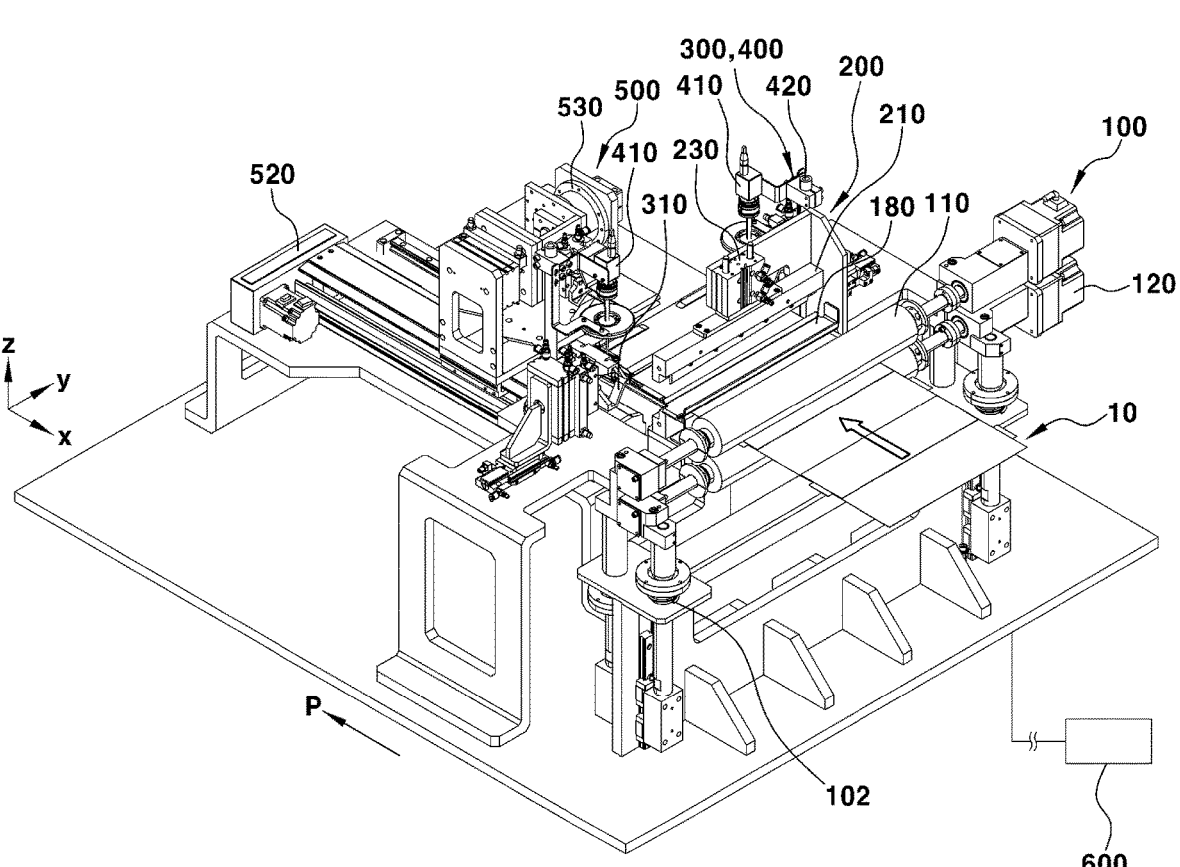
FIG. 4 is a perspective view of a system for manufacturing an electrode assembly according to the present disclosure.
Figure 5:
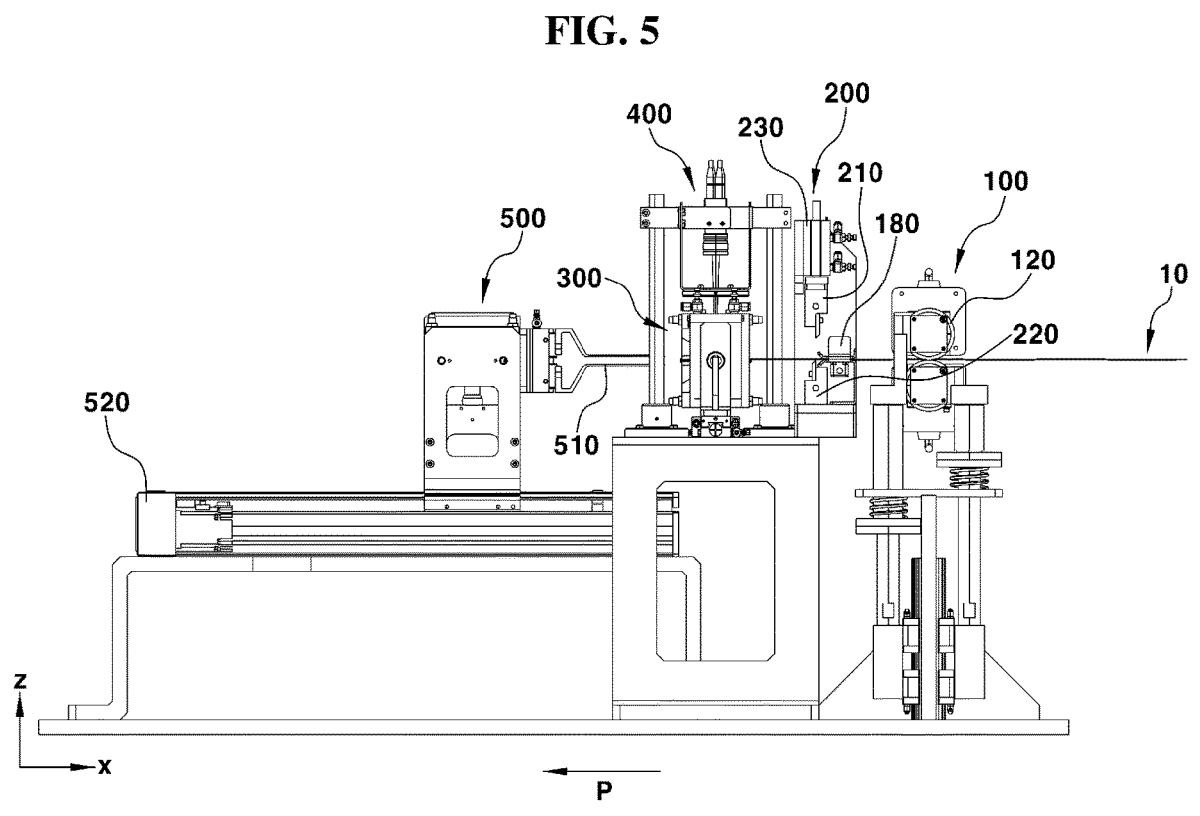
Figure 6:
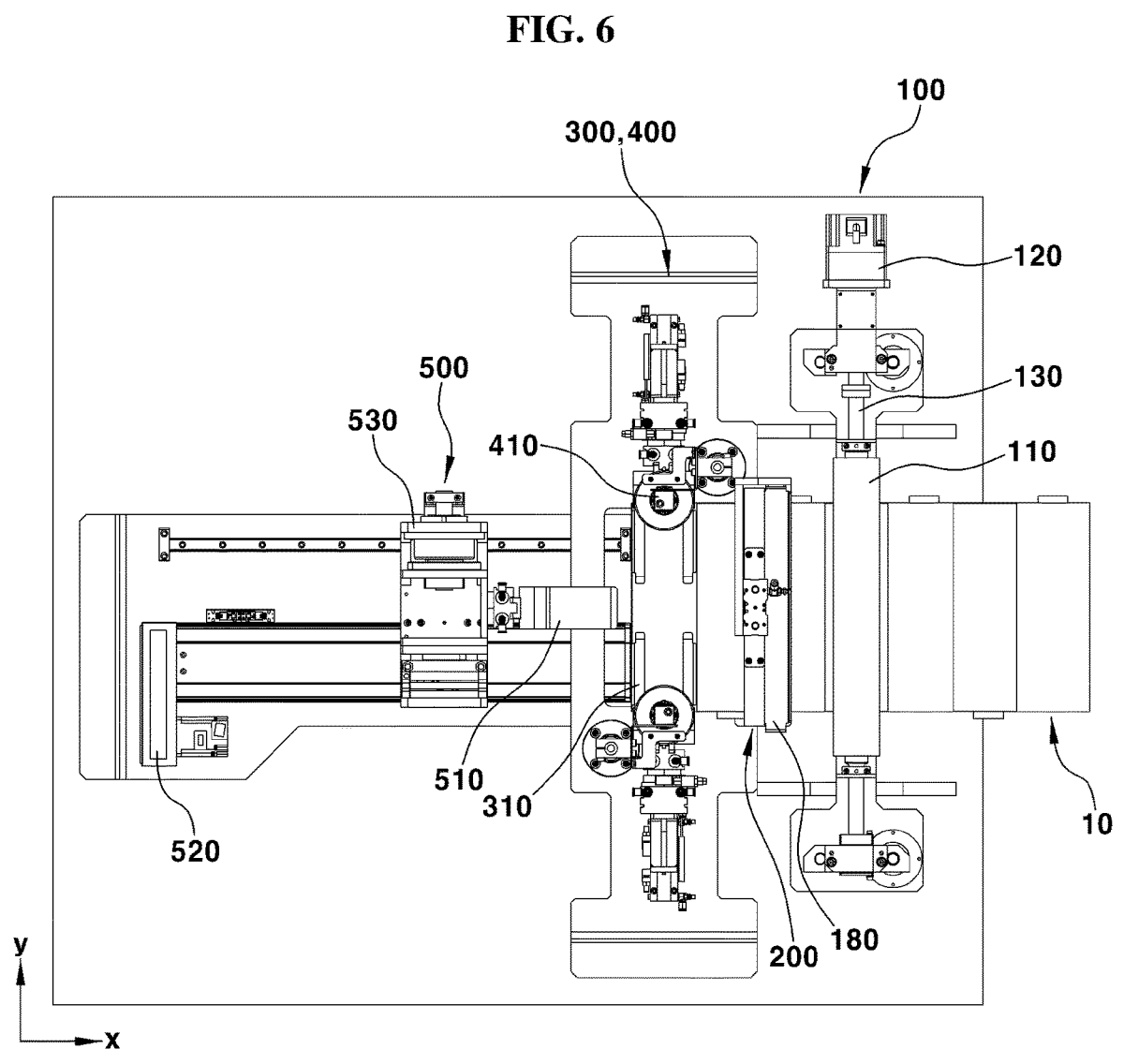

As shown in FIGS. 4 to 6, a system for manufacturing an electrode assembly according to the present disclosure may comprise a supply device 100, a cutting device 200, a folding device 300, a bonding device 400, and/or a holding device 500.

Figure 7:
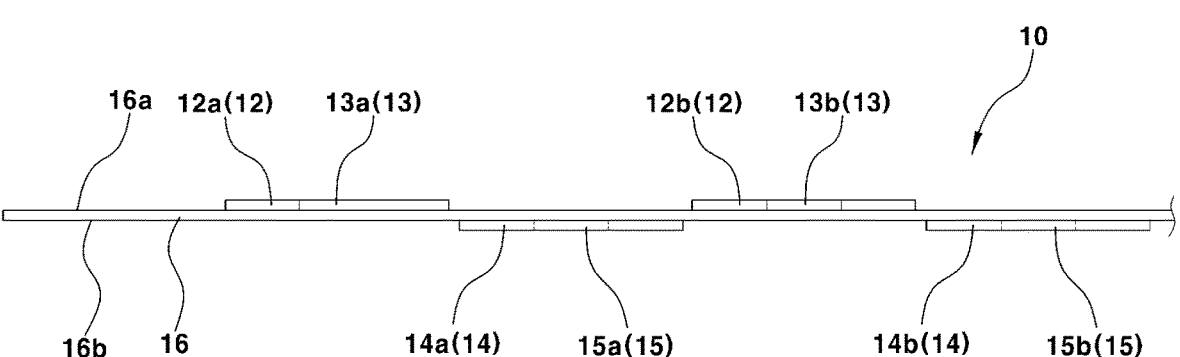
FIG. 7 is a longitudinal-sectional view of an example laminated body.

The supply device 100 may be configured to supply a laminated body 10 to the system. As shown in FIG. 7, the laminated body 10 may comprise positive electrodes 12, negative electrodes 14, and/or a separator 16. The positive electrodes 12 may be disposed on a first surface 16a of the separator 16 so as to be spaced apart from each other by a designated distance. The negative electrodes 14 may be disposed on a second surface 16b of the separator 16 opposite to the first surface 16a so as to be spaced apart from each other by a designated distance. In other words, the positive electrodes 12 and the negative electrodes 14 may be alternately disposed in a process direction P. Additionally, the positive electrodes 12 and the negative electrodes 14 may be disposed on the opposite surfaces of the separator 16.

The positive electrodes 12 may include positive electrodes tabs 13, and the/or negative electrodes 13 may include negative electrode tabs 15. Concretely, the respective positive electrodes 12a, 12b may include positive electrode tabs 13a, 13b, and/or the respective negative electrodes 14a, 14b may include negative electrode tabs 15a, 15b. As shown in FIG. 7, the positive electrodes 12 and the negative electrodes 14 may be disposed on the separator 16 such that the positive electrode tabs 13 and the negative electrode tabs 15 protrude at opposite locations in the Y-axis direction perpendicular to the process direction P. In the example implementation shown in FIG. 7, the positive electrode tabs 13 may protrude in a direction out of the page of this figure, and/or the negative electrode tabs 15 may protrude in a direction into the page of this figure. Furthermore, the first surface 16a and the second surface 16b of the separator 16 may be used to refer to both surfaces of the separator 16, and thus, the negative electrodes 14 may be disposed on the first surface 16a, and/or the positive electrodes 12 may be disposed on the second surface 16b.

Figure 8:
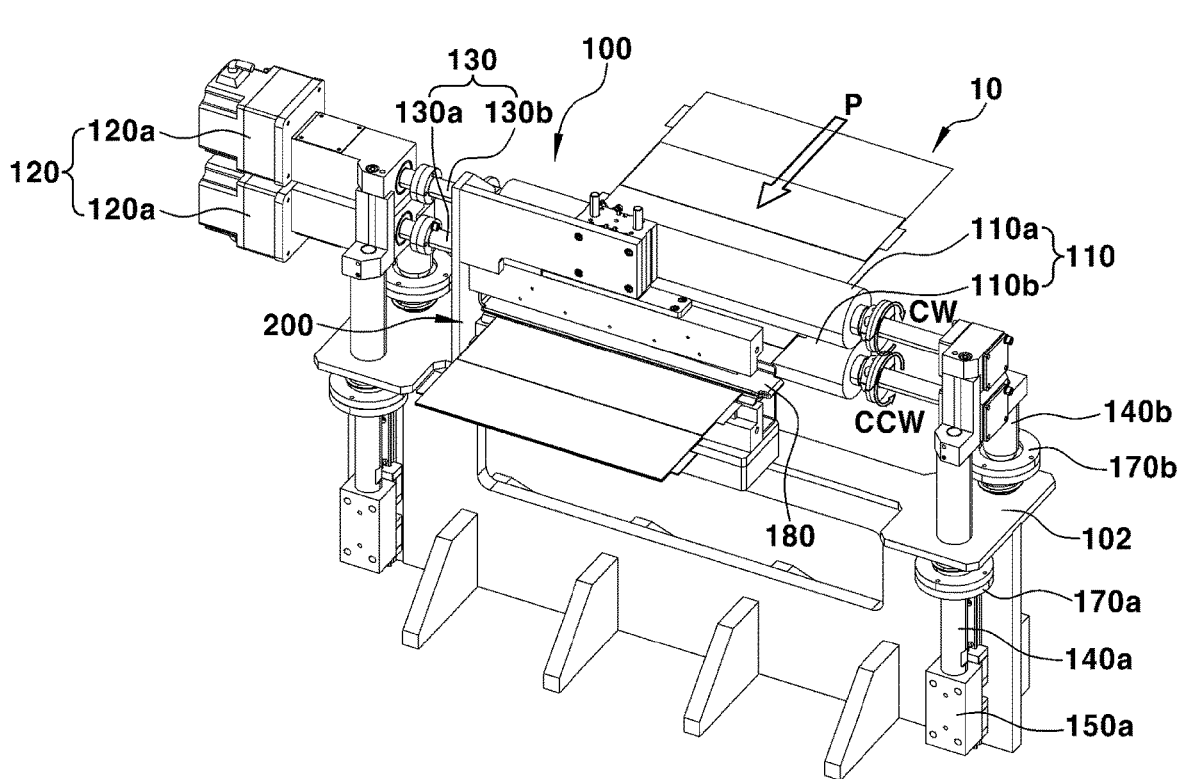
FIG. 8 is a perspective view showing an example supply device of the system according to the present disclosure.

The supply device 100 may include elements configured to supply the laminated body 10 to the system. As shown in FIG. 8, the supply device 100 may include a pair of rollers 110. Among the pair of rollers 110, one roller may be referred to as an upper roller 110a, and/or the other roller may be referred to as a lower roller 110b.

The pair of rollers 110 may be supported by a base 102. The pair of rollers 110 may be disposed at upper and lower positions above the base 102. The pair of rollers 110 may include the upper roller 110a disposed at the upper position and/or the lower roller 110b disposed at the lower position. The pair of rollers 110 is configured to be rotatable, and may thus move the laminated body 10 in the process direction P. For this purpose, the pair of rollers 110 may be configured to be rotated in opposite directions. As shown in this figure, the upper roller 110a may be configured to be rotated in the clockwise (CW) direction, and/or the lower roller 110b may be configured to be rotated in the counterclockwise (CCW) direction, so as to move the laminated body 10 in the process direction P. In one example, the surfaces of the rollers 110 may be formed of a material which does not damage the laminated body 10.

The pair of rollers 110 may include an actuator 120. The actuator 120 may be servomotors. Alternatively, the actuator 120 may employ any known devices which may provide rotational force to the rollers 110. In some examples, the actuator 120 may be configured to rotate both the upper roller 110a and the lower roller 110b. In one example shown in this figure, each of the rollers 120 may be rotated by a corresponding one of separate actuators 120a, 120b. The actuator 120a for the upper roller 110a may provide rotational force to the upper roller 110a, and/or the actuator 120b for the lower roller 110b may provide rotational force to the lower roller 110b. The actuator 120a for the upper roller 110a and the actuator 120b for the lower roller 110b may be controlled to be rotated at the same speed.

The respective rollers 110 may be rotatably supported by rotating rods 130. The rollers 110 may be mounted on the respective rotating rods 130, and/or the respective rotating rods 130 may be rotated by the actuator 120. The rotating rods 130 may include an upper rotating rod 130a for the upper roller 110a, and/or the lower rotating rod 130b for the lower roller 110b.

Figure 9:
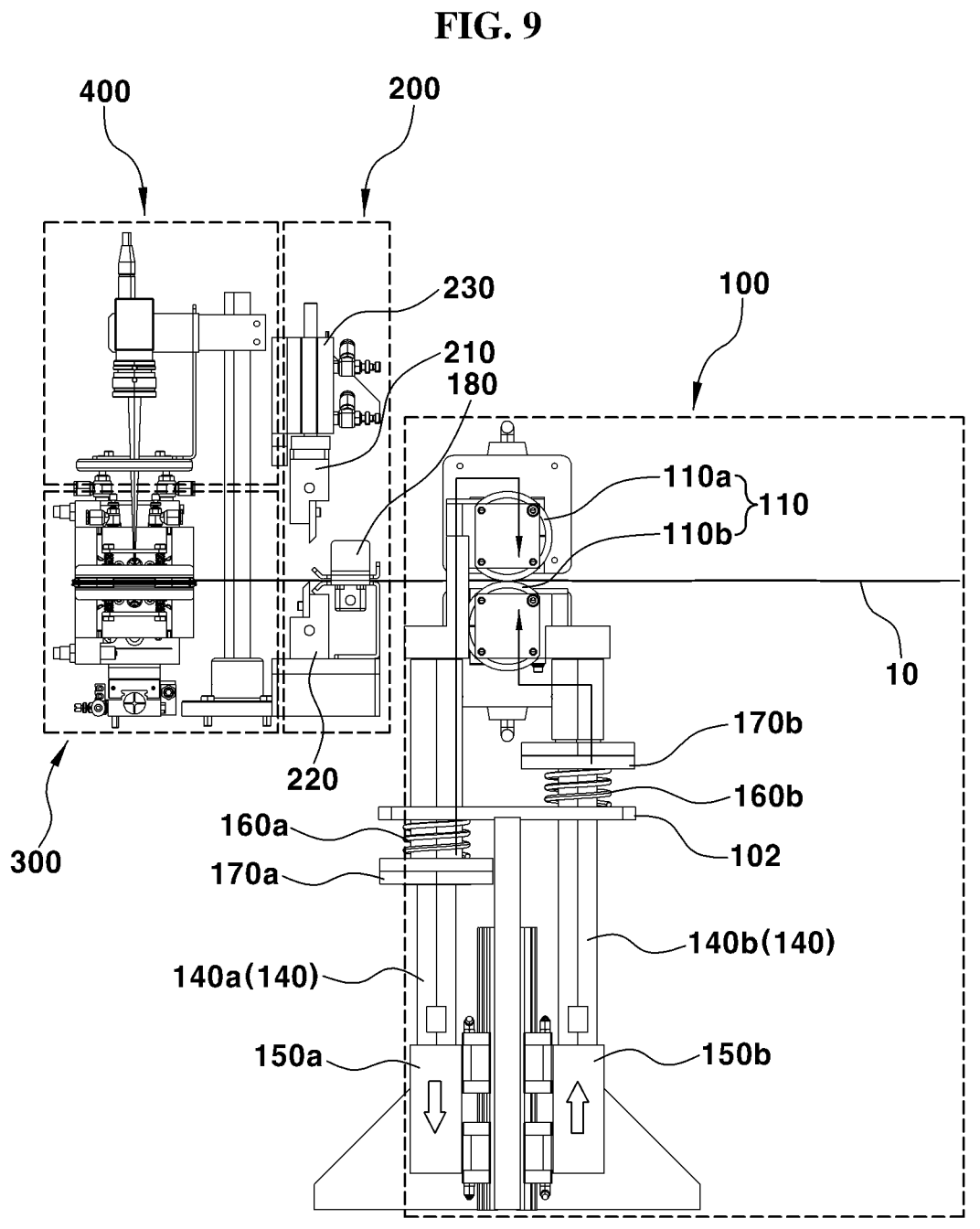

As shown in FIG. 9, according to some examples of the present disclosure, the respective rotating rods 130a and 130b may be provided to adjust a gap between the upper roller 110a and the lower roller 110b and/or to correspond to the supply position of the laminated body 10. Particularly, the upper rotating rods 130a and the lower rotating rods 130b may be operated in connection with each other.

For this purpose, the respective rotating rods 130a and 130b may be supported by respective supports 140, e.g., upper supports 140a and lower supports 140b. Further, the respective supports 140a and 140b may be configured to be elevated and/or lowered by elevation motors 150a and 150b. The upper supports 140a of the upper rotating rod 130a and/or the lower supports 140b of the lower rotating rod 130b may be disposed around the rotating rods 130 so as to overlap each other. The upper supports 140a and/or the lower supports 140b may be supported by the base 102 using respective springs 160a and 160b.

The respective supports 140 may be configured to penetrate the base 102, and/or the respective supports 140 may include flanges 170a and 170b. A spring 160a may be disposed between the base 102 and the flange 170a of the upper support 140a, and/or a spring 160b may be disposed between the base 102 and the flange 170b of the lower support 140b. For example, the spring 160a of the upper support 140a may be disposed under the base 102, and/or the spring 160*b* of the lower support 140*b* may be disposed on the base 102. For example, even when the respective supports 140 are elevated by the respective elevation motors 150*a* and 150*b*, the gap between the rollers 110 may be maintained at all times by the springs 160*a* and 160*b* and/or may thus apply a predetermined pressing force to the laminated body 10 inserted between the rollers 110.

A guide 180 may be disposed downstream from the rollers 110 in the process direction P. The guide 180 may be configured to guide the progress of the laminated body 10 passing through the rollers 110. In some examples, the guide 180 may be disposed upstream from the cutting device 200.

The cutting device 200 may configured to be operated at the time of need so as to cut the laminated body 10 into a predetermined size. Here, the predetermined size may indicate a size which may form one electrode assembly. In some examples, the cutting device 200 may include an upper cutter 210 and a lower cutter 220 disposed above and below the laminated body 10, respectively. Any one of the upper cutter 210 and the lower cutter 220 may be configured to be movable so as to cut the supplied laminated body 10 at the time of need. For example, the upper cutter 210 may be driven by an actuator 320 so as to cut the laminated body 10. As the actuator 230 of the cutting device 200, any known actuator, such as an electric, hydraulic or pneumatic actuator, may be employed.

The folding device 300 and/or the bonding device 400 may be disposed downstream from the cutting device 200. The folding device 300 may be configured to fold the laminated body 10 in zigzags, and/or the bonding device 400 may be configured to temporarily bond the neighboring electrode tabs 13 and 15 in the folded laminated body 10. In some examples, the bonding device 400 may be laser welding sources.

Figure 10:
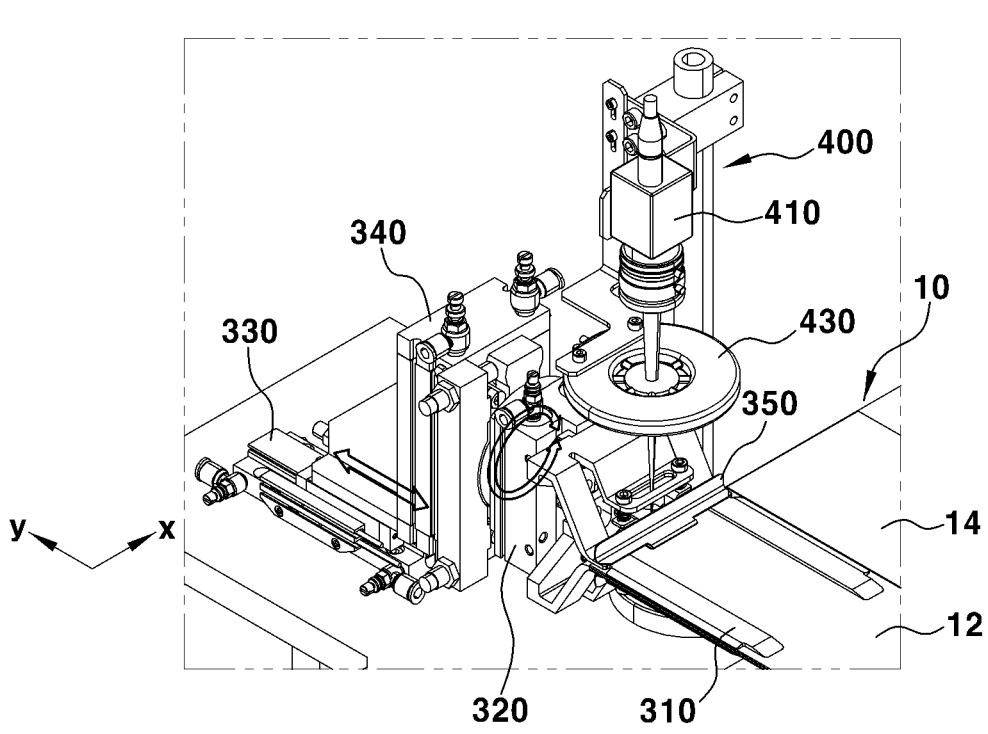
FIG. 10 is a perspective view showing an example folding device and an example bonding device of the system according to the present disclosure.

As shown in FIG. 10, the folding device 300 may be configured to fold the laminated body 10 so as to manufacture the electrode assembly. For this purpose, each of the folding device 300 may include grip units 310. The grip units 310 may include a clearance I formed in the Z-axis direction, and/or may be configured to grip the laminated body 10 inserted into the clearance I. That is, each of the grip units 310 may include an upper grip 312 and/or a lower grip 314. Particularly, the grip units 310 may be provided in a pair so as to grip both sides of the respective electrodes 12 and 14 disposed on the laminated body 10. In order to stably grip the laminated body 10, the grip units 310 may be disposed to be spaced apart from each other by a width sufficient to grip both ends of the respective electrodes 12 and 14. Further, two folding devices 300 and two bonding devices 400 may be provided in the Y-axis direction so as to be operated at both sides of the laminated body 10.

The grip units 310 may be configured to grip the respective positive electrodes 12 or negative electrodes 14 of the laminated body 10. The grip units 310 may grip the positive electrodes 12 or the negative electrodes 14 in a direction (i.e., the Y-axis direction) perpendicular to the folding direction (i.e., the X-axis direction). In another aspect, the grip units 310 may grip the laminated body 10 at a side of the laminated body 10, at which the positive electrode tabs 13 or the negative electrode tabs 15 are formed.

Figure 11:
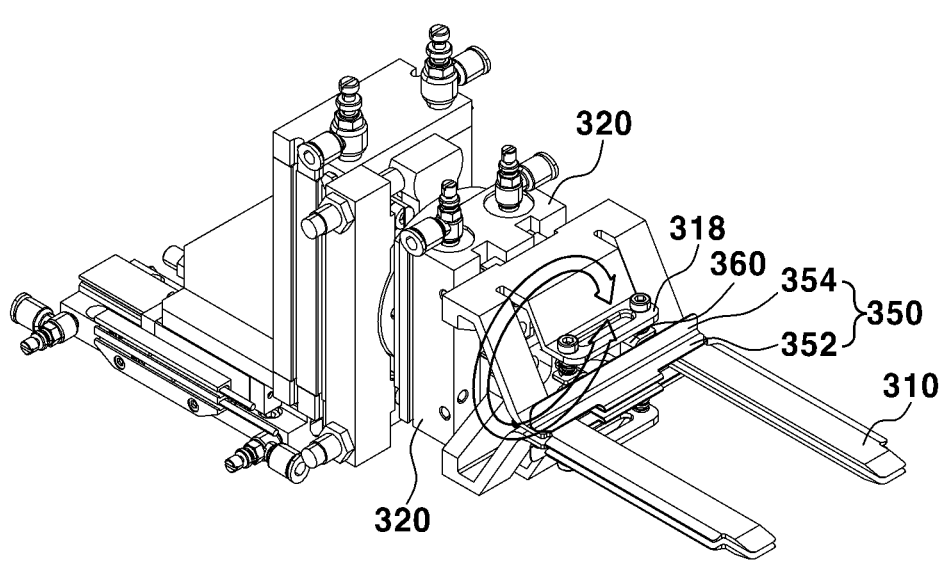
FIG. 11 is a perspective view showing the folding device of the system according to the present disclosure.

Referring to FIG. 11, the grip units 310 may be configured to be rotatable. The grip units 310 may be configured to be rotatable in the clockwise (CW) direction and/or the counterclockwise (CCW) direction. In some examples of implementation, the grip units 310 may be configured to be rotated by an actuator 320 including an electric motor.

Further, the grip units 310 may be configured to be movable. The folding device 300 may include an actuator 340 configured to move the grip units 310 on a rail 330. As the rail 330 and the actuator 340, known devices which may move the grip units 310 may be employed. The grip units 310 may be configured to be moved in a direction towards the laminated body 10 or a direction away from the laminated body 10.

Figure 12:
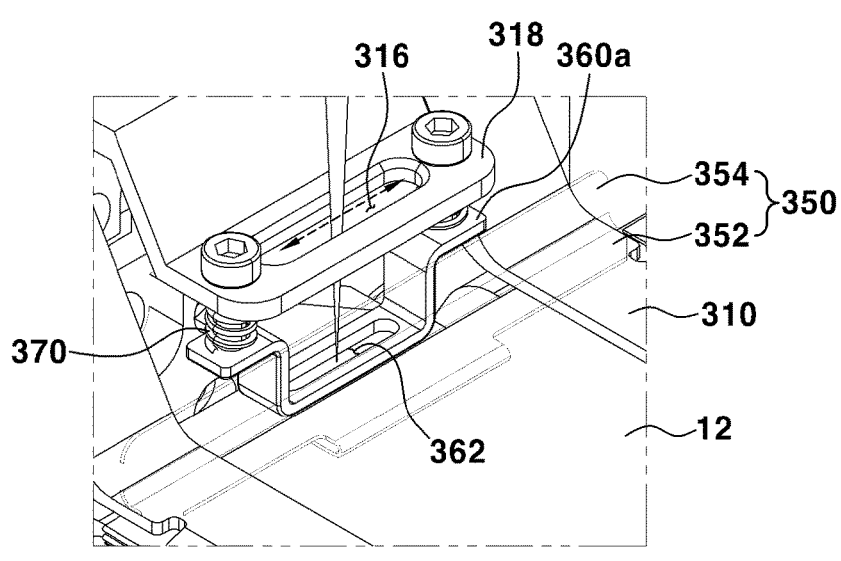
FIG. 12 is a partially enlarged view of FIG. 11.

As shown in FIG. 12, the grip units 310 may include a blocking member 350. The blocking member 350 may block spatter generated on the electrode 12 or 14 extending from the electrode tab 13 or 15 due to laser welding. In some examples, the blocking member 350 may include a horizontal part 352 configured to extend substantially parallel to the laminated body 10 between the grip units 310, and a vertical part 354 configured to extend vertically to the horizontal part 352.

Figure 13:
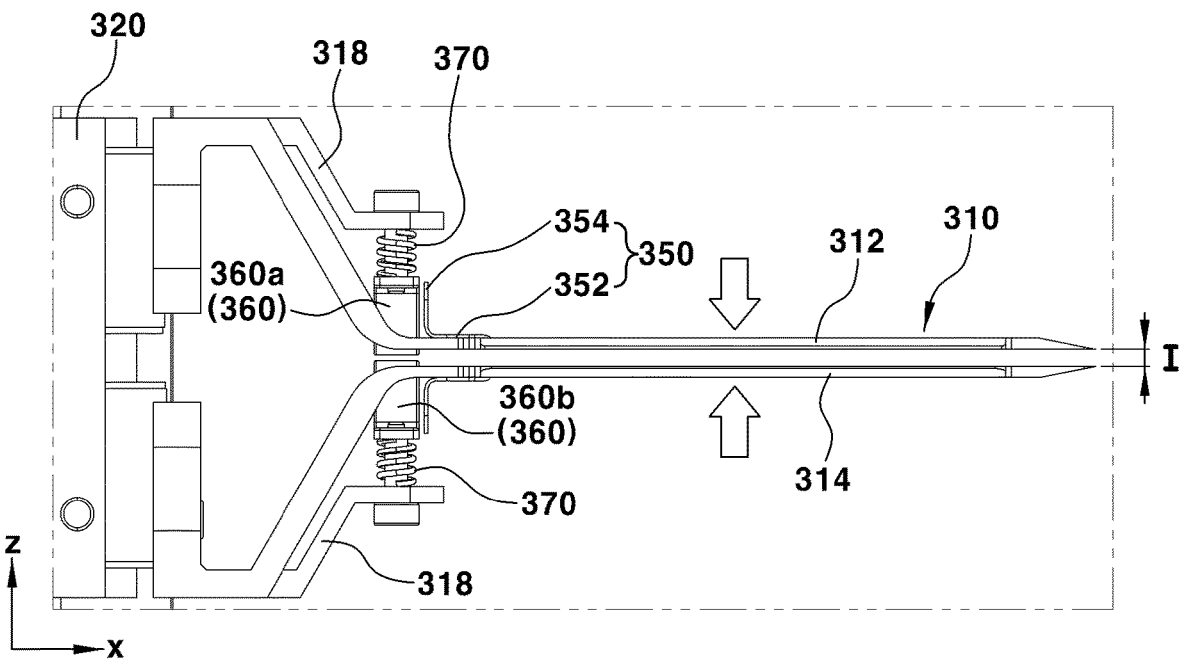
FIG. 13 is a front view of an example grip unit of the folding device.

Referring to FIG. 13, the grip units 310 may include contact jigs 360. The contact jigs 360 may be respectively provided on the upper grips 312 and the lower grips 314. An upper contact jig 360*a* may be connected to the upper grips 312 by elastic members 370, and a lower contact jig 360*b* may be connected to the lower grips 314 by elastic members 370. The upper contact jig 360*a* and the lower contact jig 360*b* may face each other, and/or may be spaced apart from each other by a designated interval so that the electrode tabs 13 or 15 to be temporarily bonded may be disposed between the contact jig 360*a* and the lower contact jig 360 and/or may be pressed.

A through hole 362 may be formed through each of the contact jigs 360 so as to radiate a laser beam therethrough. The laser beam may be radiated through the through hole 362, and the through hole 362 may be formed to have a similar size to the width of the electrode tabs 13 and 15. In some examples, the grip units 310 may include a protrusion 318 including a passage 316 through which the laser beam may pass. The passage 316 of the protrusion 318 may have a size that is at least equal to or greater than the size of the through hole 362.

Referring again to FIG. 10, the folding device 400 may be configured to temporarily bond the electrode tabs 13 or 15 of the electrodes 12 or 14 stacked by folding the laminated body 10. The folding device 400 may include a laser beam emitter 410. The laser beam emitter 410 may radiate a laser beam towards the inside of the through hole 362 through the passage 316 so as to temporarily bond the electrode tabs 13 or 15.

The laser beam emitter 410 may be configured to be movable back, forth, left and/or right. For this purpose, the laser beam emitter 410 may include an actuator 420 configured to move the laser beam emitter 410 in the X-axis direction, the Y-axis direction and/or the Z-axis direction. In the same manner as other actuators used in the system according to the present disclosure, a known actuator may be employed as the actuator 420.

A ring member 430 may be disposed between the laser beam emitter 410 and the electrode tabs 13 or 15 to be temporarily bonded. The ring member 430 may emit high-temperature air so as to form an air curtain towards the center of the ring member 430. The air curtain may prevent contamination of a lens of the laser beam emitter 410 by the spatter at the time of temporary bonding.

Figure 14:
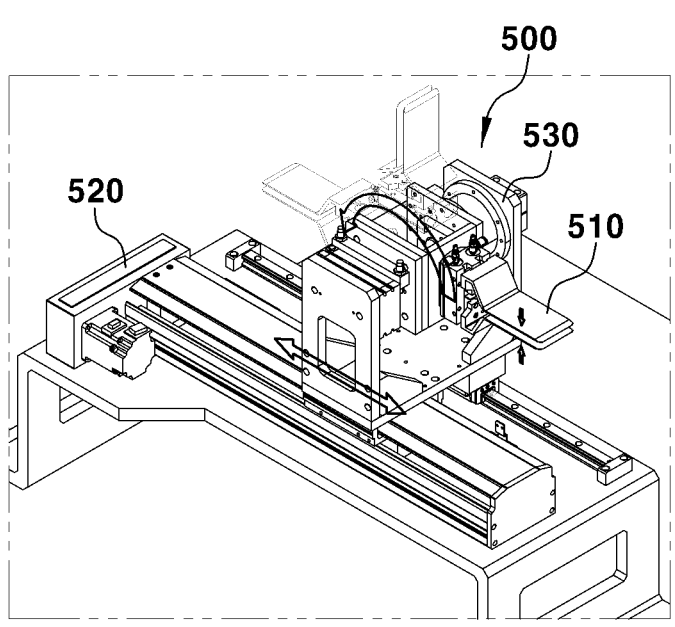
FIG. 14 is a perspective view of an example holding device of the system according to the present disclosure.

Referring to FIG. 14, the holding device 500 may be disposed downstream from the bonding device 400. The holding device 500 may provide fixing power to the laminated body 10 which is being folded by the folding device

300. Further, the holding device 500 may transfer the electrode assembly, acquired by folding, to a subsequent process.

Figure 15:
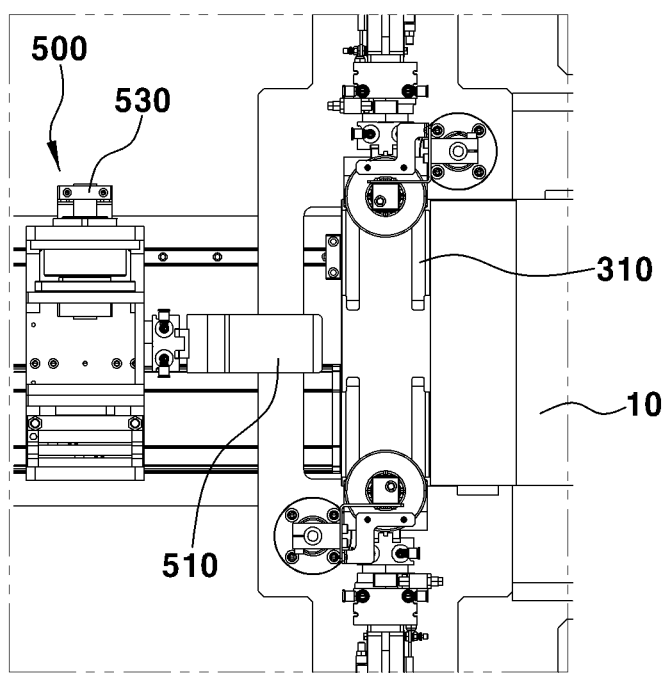
FIG. 15 is a plan view of the example holding device of the system according to the present disclosure.

As shown in FIG. 15, the holding device 500 may continue to provide fixing power to the laminated body 10 which is being folded. The holding device 500 may include a gripper 510, and thus, the holding device 500 may be moved towards laminated body 10 without interference with the grip units 310 even when the grip units 310 grip the laminated body 10 which is being folded.

The holding device 500 may be configured to be movable. The gripper 510 may retreat while the laminated body 10 is being folded by the grip units 310, and may be moved toward the laminated body 10 as needed so as to provide fixing power to the electrode assembly which is being folded. For this purpose, the holding device 500 may be mounted on an actuator 520, such as an electric cylinder or an electric guide.

The holding device 500 may include a rotating actuator 530 configured to rotate the gripper 510. The rotating actuator 530 is configured to rotate the gripper 510 about 180 degrees. A known actuator, such as a servomotor, may be employed as the rotating actuator 530. The gripper 510 may be rotated to grip the electrode assembly, acquired by folding, and then to transfer the electrode assembly to a subsequent process. That is, the gripper 410 may be rotated by the rotating actuator 530, and may then be moved by the actuator 520 so as to transfer the electrode assembly to the subsequent process.

Referring back to FIG. 4, a controller 600 may be configured to control and supervise the respective elements of the system. For example, the controller 600 may drive the respective actuators at respective required times. Further, for example, the controller 600 may control the laser beam emitter 410 so as to execute a predetermined operation.

Particularly, the controller 600 may move the laser beam emitter 410 in a predetermined pattern so that, when the stacked electrode tabs 13 or 15 are temporarily bonded, temporarily bonded parts of the electrode tabs 13 or 15 do not overlap with each other. Referring to FIG. 7, for example, on the assumption that the first positive electrode 12a is the first to be folded, the first positive electrode 12a, the second positive electrode 12b, and the third positive electrode 12c, are disposed on the first surface 16a of the separator 16 so as to be spaced apart from each other. Further, on the second surface 16b of the separator 16, the first negative electrode 14a may be disposed between the first positive electrode 12a and the second positive electrode 12b, and the second negative electrode 14b may be disposed between the second positive electrode 12b and the third positive electrode 12c.

The laminated body 10, which is supplied in the above manner, may be folded by the folding device 300 so that the second positive electrode tab 13b of the second positive electrode 12b is stacked on the first positive electrode tab 13a of the first positive electrode 12a, and the second negative electrode tab 15b of the second negative electrode 14b is stacked on the first negative electrode tab 15a of the first negative electrode 14a, and such a process is repeated as folding of the laminated body 10 progresses.

The stacked positive electrode tabs 13a, 13b, or the stacked negative electrode tabs 15a, 15b, may be temporarily bonded by the bonding device 400. Here, the controller 600 may move the laser beam emitter 410 so that the temporarily bonded parts of the respective electrode tabs 13 or 15 do not overlap each other. When the temporarily bonded parts overlap each other, heat may be further applied to the temporarily bonded parts which have been formed already, and may thus damage a base material, and therefore, the controller 600 may control the laser beam emitter 410 in the above manner.

Figure 16A:
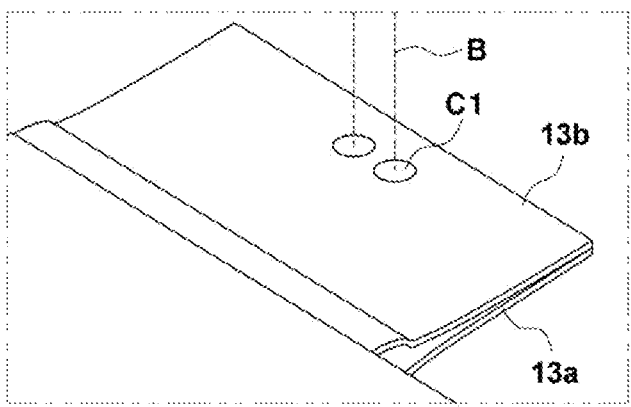
FIGS. 16A, 16B, and 16C are views showing a temporary bonding pattern formed on positive electrodes by the bonding device of the system according to the present disclosure.
Figure 16B:
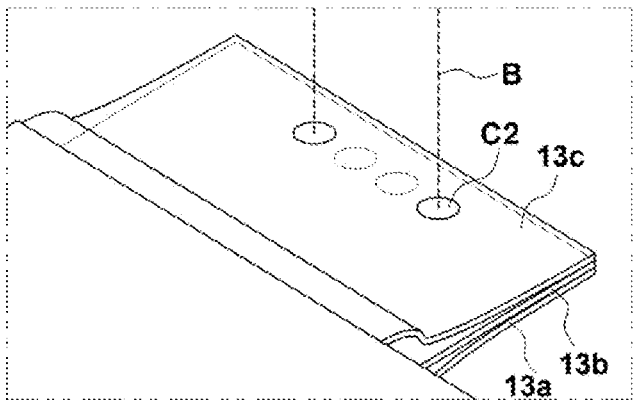
Figure 16C:
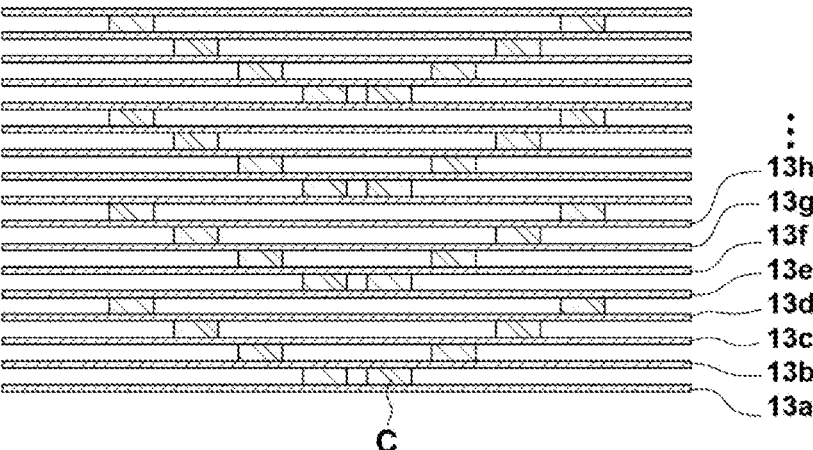

As an example, as shown in FIG. 16A, when the second positive electrode 12b is stacked on the first positive electrode 12a, the first positive electrode tab 13a and the second positive electrode tab 13b thereon may be temporarily bonded so as to form first temporarily bonded parts C1. Thereafter, as shown in FIG. 16B, when the second positive electrode tab 13a and the third positive electrode tab 13c thereon are temporarily bonded, the laser beam emitter 410 may be operated to emit a laser beam B outside the first temporarily bonding parts C1. Therefore, the laser beam emitter 410 may temporarily bond the second positive electrode tab 13a and the third positive electrode tab 13c so as to form second temporarily bonded parts C2 which do not overlap the first temporarily bonded parts C1. As shown in FIG. 16C, such a process may be repeated. The laser beam emitter 410 may be controlled to emit the laser beam B so as to temporarily bond the positive electrode tabs 13 while moving outwards, and to be moved back to the center so as to temporarily bond the positive electrode tabs 13, after a predetermined number of times of temporary bonding has been completed (for example, four to five electrodes have been stacked). In FIG. 16C, shaded parts C indicate temporarily bonded parts, and reference numerals 13d, 13e, 13f, 13g, 13h indicate respective positive electrode tabs which are sequentially stacked and temporarily bonded.

Figure 17A:
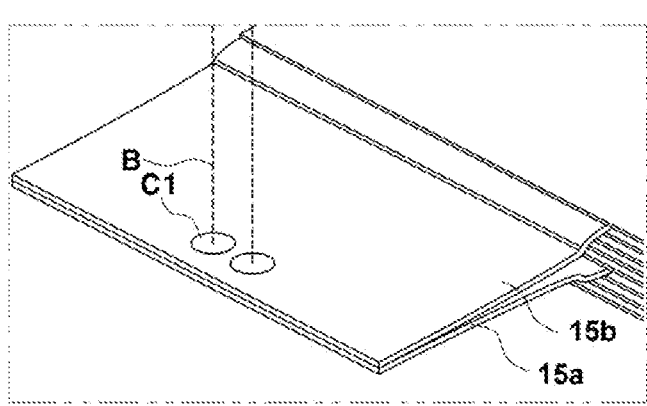
FIGS. 17A, 17B, and 17C are views showing a temporary bonding pattern formed on negative electrodes by the bonding device of the system according to the present disclosure.
Figure 17B:
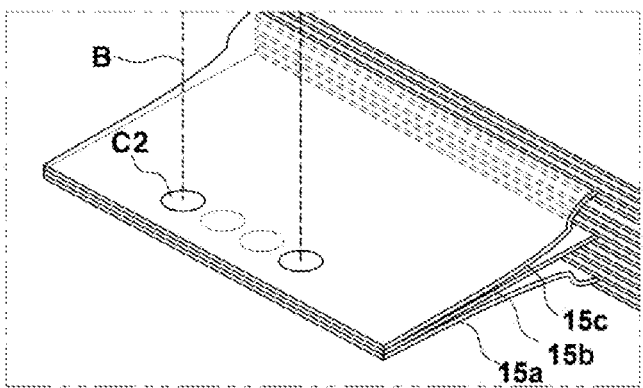
Figure 17C:
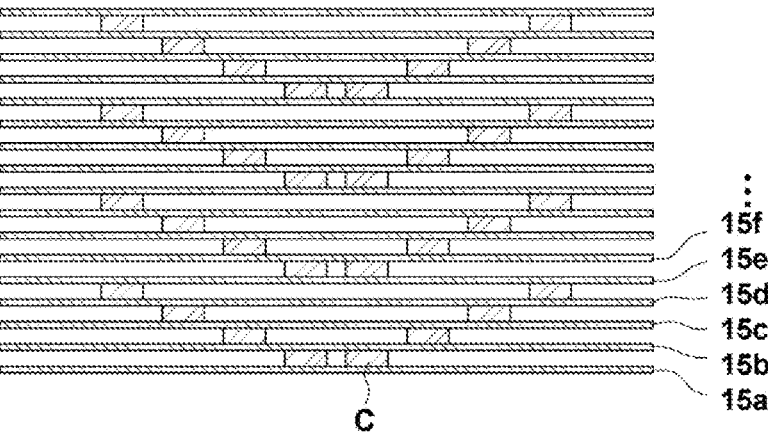

The controller 600 may control the laser beam emitter 410 so as to temporarily bond respective negative electrode tabs 15a, 15b, 15c, 15d, 15e, 15f in the same manner as the positive electrode tabs 13. Such an operation is shown in FIGS. 17A to 17C, and is operated in the same manner as the positive electrode tabs 13, and a detailed description thereof will thus be omitted.

FIGS. 18 to 23 illustrate a process of operating the folding device 300 and the gripper 510 of the system according to the present disclosure in the state of being interlocked with each other.

Figure 18:
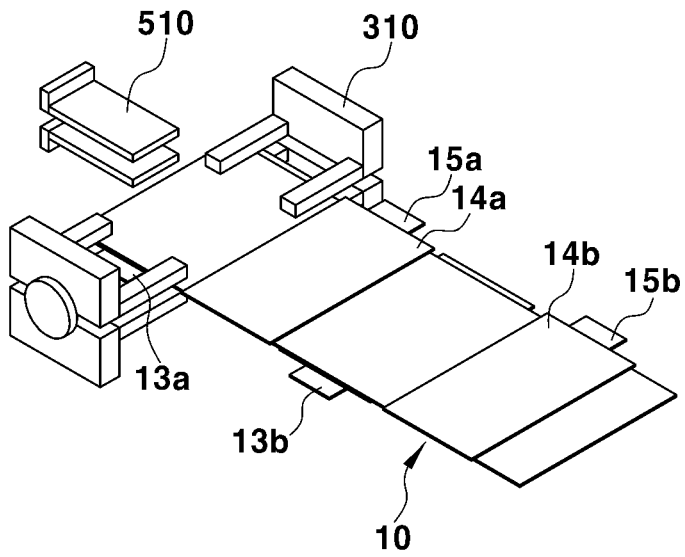
FIGS. 18, 19, 20, 21, 22, and 23 are perspective views showing an example process of folding the laminated body by the folding device of the system according to the present disclosure.

As shown in FIG. 18, when the first positive electrode 12a of the laminated body 10, which is supplied, reaches the grip units 310, the grip units 310 may be moved towards the laminated body 10 to grip the first positive electrode 12a.

Figure 19:
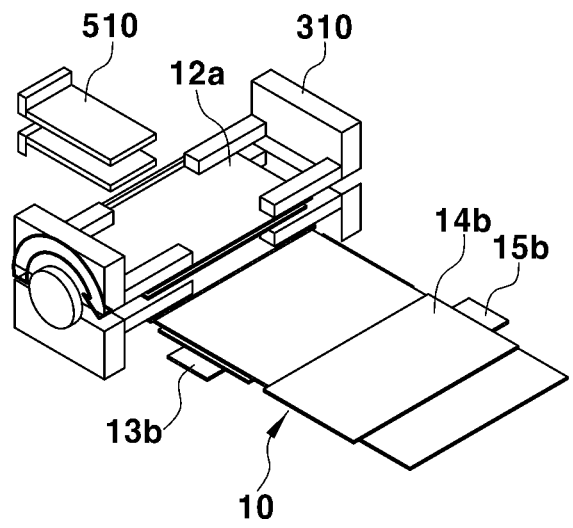

Thereafter, as shown in FIG. 19, the grip units 310 may be rotated, for example, 180 degrees in the clockwise direction, by the actuator 320. In this case, the first positive electrode 12a may be stacked on the first negative electrode 14a with the separator 16 provided therebetween.

Figure 20:
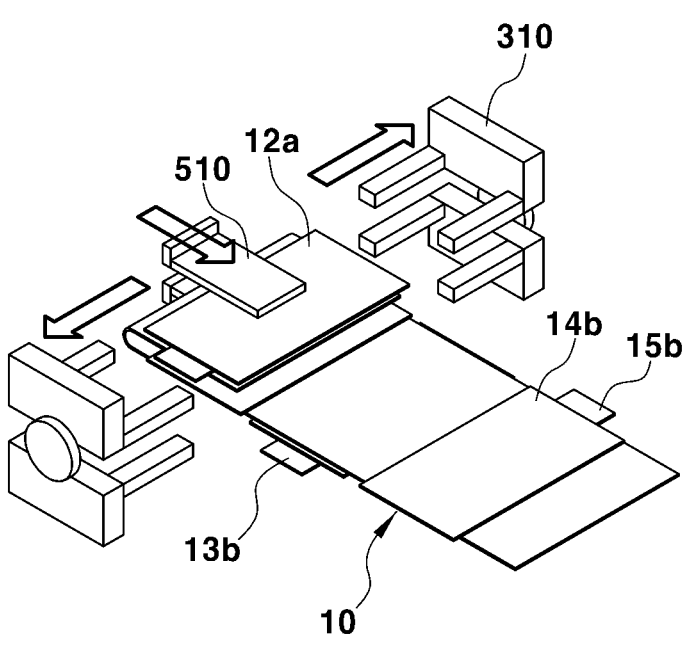

Thereafter, as shown in FIG. 20, the gripper 510 may be moved towards the laminated body 10 so as to provide pressing force to fix the first positive electrode 12a and the first negative electrode 14a of the folded laminated body 10. The gripper 510 and the grip units 310 may be designed so as not to interfere with each other, as described above, and/or the grip units 310 may be configured to retreat when the gripper 510 applies fixing force.

Figure 21:
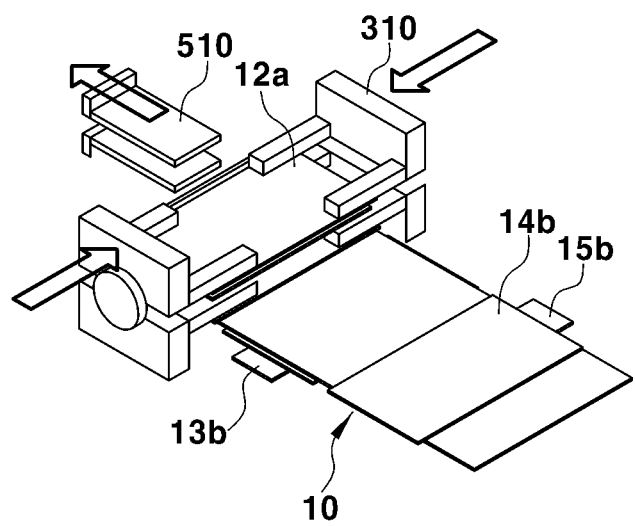
Figure 22:
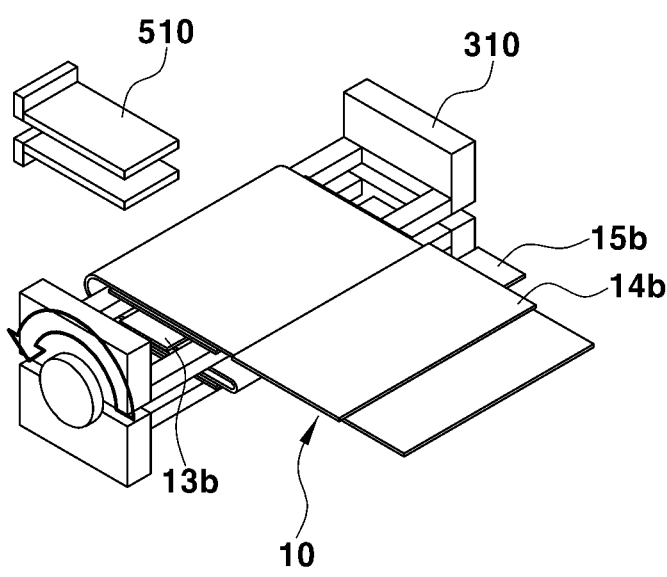

As shown in FIG. 21, the gripper 510 may retreat after providing the pressing force, the grip units 310 may be moved again towards the laminated body 10 so as to achieve folding of the laminated body 10. Thereafter, as shown in FIG. 22, the actuator 320 may rotate the grip units 310 180 degrees in the counterclockwise direction. Thereby, the second positive electrode 12b (having the positive electrode tab 13b) may be stacked on the first negative electrode 14a with the separator 16 provided therebetween.

Figure 23:
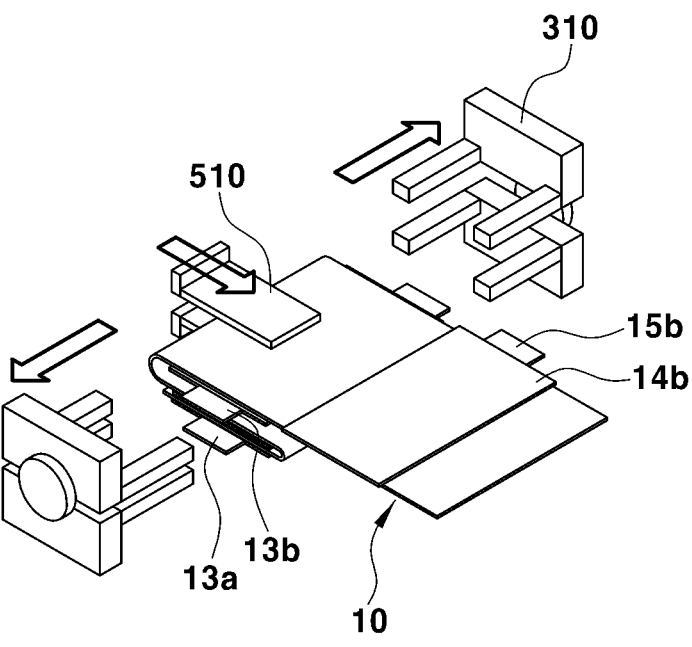

Thereafter, as shown in FIG. 23, the gripper 510 may be moved again towards the laminated body 10 so as to press the folded laminated body 10. Here, the first positive electrode 12a and the second positive electrode 12b may have the same polarity, and thus, the first positive electrode tabs 13a of the first positive electrode 12a and the second positive electrode tabs 13b of the second positive electrode 12b may be temporarily bonded by the bonding device 400. The electrode assembly may be manufactured by repeating the above process.

As described above, the system according to the present disclosure manufactures the electrode assembly by folding the laminated body, in which the positive electrodes and the negative electrodes may be disposed on the separator, in zigzags, thereby being capable of greatly increasing a manufacturing speed.

Further, the system according to the present disclosure performs temporary bonding between the positive electrodes tabs and between the negative electrode tabs simultaneously with folding of the laminated body during the manufacturing process, thereby being capable of preventing deterioration of electrode alignment, which may occur during the process.

As is apparent from the above description, the present disclosure provides a system for manufacturing an electrode assembly which may prevent deterioration of alignment between electrodes during manufacture of the electrode assembly.

The present disclosure provides a system for manufacturing an electrode assembly which may speed up manufacture of the electrode assembly for batteries.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The present disclosure may solve the above-described problems of misalignment of the electrodes 810 during manufacture of the electrode assembly, and it is an object of the present disclosure to provide a system for manufacturing an electrode assembly which may prevent misalignment between electrodes during manufacture of the electrode assembly.

It is another object of the present disclosure to provide a system for manufacturing an electrode assembly which may speed up the electrode assembly for batteries.

In one aspect, the present invention provides a system for manufacturing an electrode assembly, including a folding device configured to fold a laminated body, configured such that a plurality of electrodes is disposed on a separator, into the electrode assembly, and bonding device configured to temporarily bond electrode tabs of electrodes stacked on each other by folding the laminated body, during folding of the laminated body by the folding device.

In another aspect, the present invention provides a method of manufacturing an electrode assembly, including supplying, by a supply device, a laminated body configured such that a plurality of electrodes is disposed on a separator, the electrodes including positive electrodes and negative electrodes disposed on different surfaces of the separator such that the positive electrodes and the negative electrodes are alternately disposed thereon, folding, by a folding device, the laminated body, supplied by the supply device, into the electrode assembly, temporarily bonding, by a bonding device, electrode tabs of electrodes stacked on each other by folding the laminated body, and providing, by a holding device, fixing force to the laminated body during folding of the laminated body.

What is claimed is:

1. A method of manufacturing an electrode assembly, comprising:
supplying, to grip units, a laminated body comprising a plurality of electrodes disposed on a separator, wherein the plurality of electrodes comprise positive electrodes and negative electrodes disposed on different surfaces of the separator, and wherein the positive electrodes and the negative electrodes are alternately disposed on the separator; and
forming the electrode assembly by:
folding, by the grip units, the laminated body; and
during folding of the laminated body by the grip units:
bonding at least two electrodes of the laminated body; and
providing, by grippers, fixing force to the laminated body.

2. The method of claim 1, wherein folding the laminated body comprises:
gripping, by the grip units, a first positive electrode of the laminated body; and
folding, by rotating the grip units in a first direction, the laminated body such that the first positive electrode is stacked onto a first negative electrode, of the laminated body, located near the first positive electrode.

3. The method of claim 2, wherein folding the laminated body further comprises:
moving the grip units in a direction away from the laminated body; and
pressing, by the grippers, the first negative electrode onto the first positive electrode.

4. The method of claim 3, wherein folding the laminated body further comprises:
moving the grip units in a direction towards the laminated body to grip, with the grip units, the first negative electrode and the first positive electrode; and
folding, by rotating the grip units in a second direction, the laminated body so that a second positive electrode, of the laminated body and located near the first negative electrode, is stacked onto the first negative electrode.

5. The method of claim 4, wherein folding the laminated body further comprises:
moving the grip units in the direction away from the laminated body; and
pressing, by the grippers, the first positive electrode, the first negative electrode and the second positive electrode.

6. The method of claim 5, wherein bonding the at least two electrodes of the laminated body comprises:
bonding a first positive electrode tab of the first positive electrode and a second positive electrode tab of the second positive electrode.

7. The method of claim 6, further comprising:
after bonding the first positive electrode tab and the second positive electrode tab, moving a laser to a predetermined position.

8. The method of claim 2, further comprising:
bonding, by a laser, the at least two electrodes by emitting a laser beam through one or more holes of the grip units.

9. The method of claim 1, wherein the at least two electrodes are temporarily bonded by a laser beam emitter.

10. The method of claim 1, wherein supplying the laminated body comprises:

providing, by an actuator, rotational force to a pair of rollers such that the pair of rollers are rotated in opposite directions so that the laminated body passes between the pair of rollers.

11. The method of claim 10, further comprising:

guiding, by a guide, the laminated body from the pair of rollers to the grip units, wherein the guide is disposed between the pair of rollers and the grip units.

12. The method of claim 1, further comprising:

cutting the laminated body into predetermined portions.

\* \* \* \* \*